L. F. HARZA.
HYDROMOTIVE UNIT.
APPLICATION FILED APR. 8, 1920.

1,362,304.

Patented Dec. 14, 1920.
2 SHEETS—SHEET 1.

Witness
Geert Blaauw

INVENTOR
L. F. Harza
BY
Pondelbilson
ATTORNEY

L. F. HARZA.
HYDROMOTIVE UNIT.
APPLICATION FILED APR. 8, 1920.
1,362,304.  Patented Dec. 14, 1920.
2 SHEETS—SHEET 2.
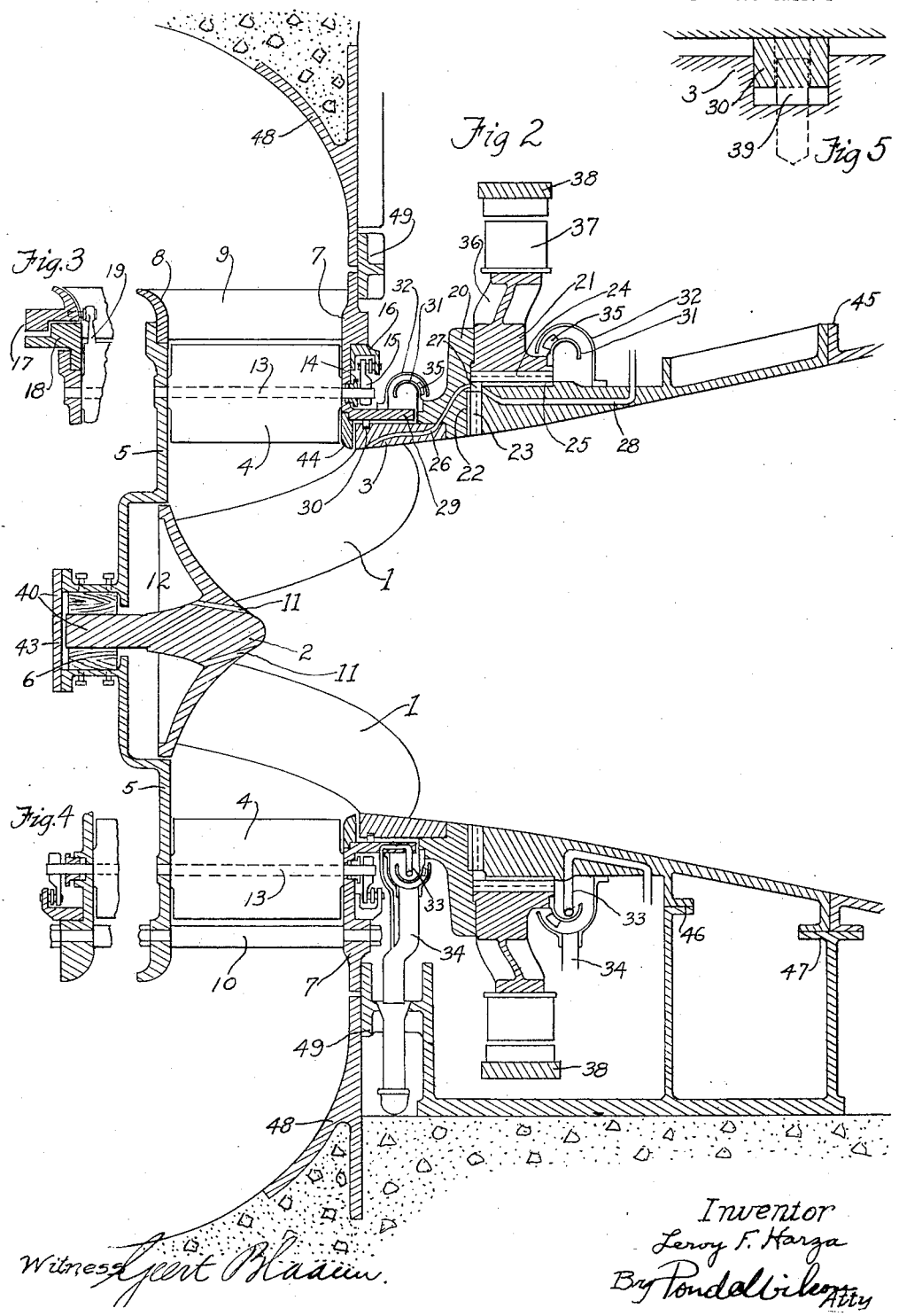
Inventor
Leroy F. Harza

UNITED STATES PATENT OFFICE.

LEROY F. HARZA, OF CHICAGO, ILLINOIS.

HYDROMOTIVE UNIT.

1,362,304. Specification of Letters Patent. Patented Dec. 14, 1920.

Application filed April 8, 1920. Serial No. 372,324.

*To all whom it may concern:*

Be it known that I, LEROY F. HARZA, a citizen of the United States, residing at Chicago, in the county of Cook and State of Illinois, have invented certain new and useful Improvements in Hydromotive Units, of which the following is a specification.

My present improvements relate to hydromotive units of inward flow type and more particularly to hydraulic turbines in which the rotor of an electrical generator or other power transmitting means as belt-pulley or gear are mounted concentrically upon the rim of the turbine as disclosed in my application for United States Letters Patent filed on the 24th day of November, 1919, Serial No. 340,137.

One of the objects of the present invention is to apply this principle of concentric mounting of turbine and generator to a turbine of standard inward flow type, so as to provide a cheap and effective unit of this type which will permit the draft tube to discharge through the generator.

Other features are the provision of improved bearing constructions for the runner, the provision of effective means for taking care of leakage and the improvement generally of the design and construction of hydromotive units of this character.

Another object is to provide a construction in which the generator rotor, pulley, gear or other means of power transmission mounted upon the band or rim of the turbine, may be offset in a downstream direction from the plane of the turbine band a sufficient distance to permit access between the generator and bulkhead for inspection against leakage of bulkhead or drainage rings and to provide space for the gate controlling mechanism.

Other objects and many of the advantages of my invention will be evident by reference to the following description when considered in connection with the accompanying drawings.

Referring to the drawings:

Fig. 2 is a section through a hydromotive unit embodying my invention along the axis of rotation;

Fig. 3 is a fragmentary cross section of the turbine inlet showing the shift ring and other gate controlling mechanism submerged within the penstock and mounted upon the entrance ring of the turbine;

Fig. 4 illustrates another form of gate controlling mechanism;

Fig. 5 is an enlarged sectional view of a sealing ring for reducing the leakage through the clearances around the runner.

Figure 1:
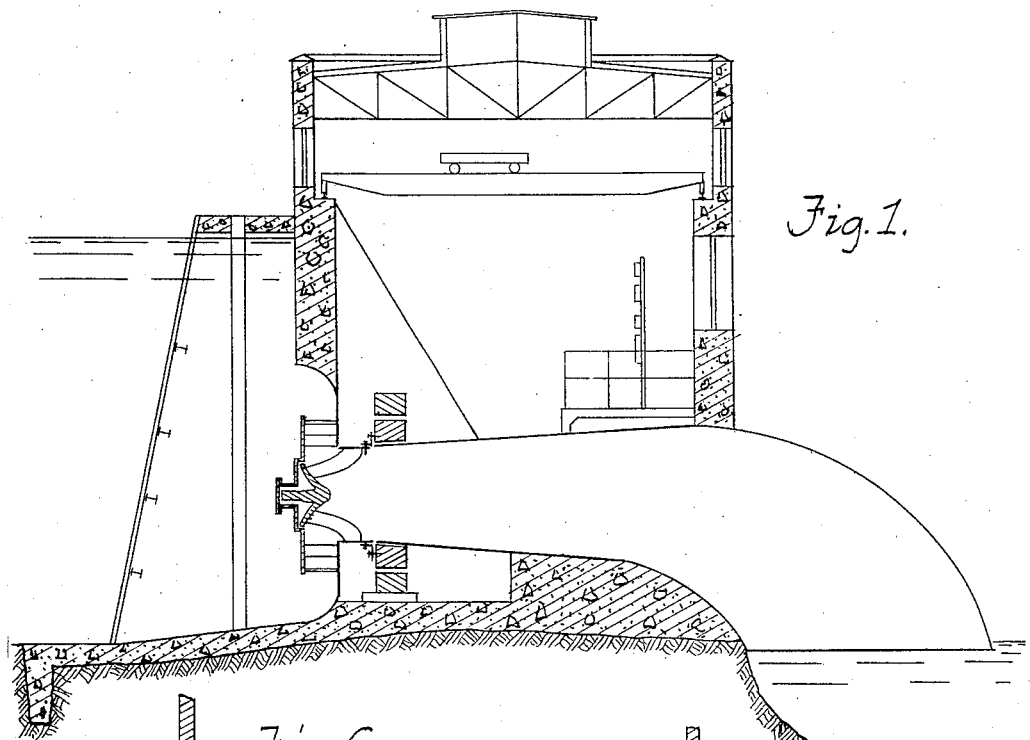
Figure 1 is a cross section of a power house embodying a hydromotive unit of my invention, the axis thereof being in a horizontal position.

By building the generator concentric with the turbine and discharging the water axially through the generator rotor, as shown in Fig. 1, the tortuous water passages are eliminated and the straight portion of the draft tube can be made as long as desirable for complete expansion to fully regain the velocity head of the water before introducing a curve into the draft tube which curve does not then appreciably detract from the efficiency of the unit because of the low velocity of the water at this point.

The preferred embodiment of my present invention applying this principle to an inward flow turbine is shown in Fig. 2, in which 1 indicates the blades of an inward flow turbine of usual type mounted at one end upon the hub 2, and attached at their other end to the band 3. The guide vanes or control gates 4 are mounted between the cover plate 5, and the bulk head plate 7. A bearing 6 for the hub, of adjustable lignum vitæ blocks, or any other preferred type, is disposed centrally within the plate 5. The turbine shaft is usually of forged steel forced into and keyed into the runner hub, for the purpose of transmitting the power of the turbine. In my invention the shaft 40 transmits no power and can be cast integral with the runner hub and turned to size when the runner band is turned, thus saving considerable shop work.

Two alternative methods are here shown for supporting the cover plate 5 rigidly at proper distance from the bulkhead plate 7. In one method the entrance ring 8 is held by fixed vanes 9, both being cast integral with the bulkhead ring 7. In the other method the cover plate is held by the shouldered spacer bolts 10. These two methods while alternative constructions, are shown in one figure for convenience of illustration.

Holes 11 are provided for venting the head water pressure from the chamber 12 into the draft tube to reduce the end thrust of the turbine. The turbine is in all respects identical with usual practice except that the gate controlling mechanism, which is usually mounted on the entrance ring, or cover plate, as in Figs. 3 or 4, is in my invention mounted upon and outside of the bulkhead or at the draft tube side of the turbine where it is readily accessible.

In this gate controlling mechanism, as shown in Fig. 2, the pivot bolts 13 extend through the guide vanes or control gates 4, which are keyed or otherwise rigidly secured thereon. These bolts may be cast integral with the gates when of cast steel and turned to size on a lathe. These pivot bolts pass through bushings in the bulkhead plate 7 and leakage is prevented by packing glands 14. A lever arm or crank 15 is keyed or otherwise rigidly attached to each pivot bolt and connected by a link to a shift ring 16 which in turn may be attached to any usual type of hydraulic turbine governor, by the usual shift arms.

Another form of gate operating mechanism is illustrated in Fig. 3 in which the shift ring 17 is shown as mounted on the entrance ring 18, each control gate being connected to the shift ring by a link and an arm 19 cast integral with the gate. In this arrangement the gate 4 is usually loose on pivot bolt 13 instead of being rigidly keyed thereto.

Another construction is shown in Fig. 4 in which the control mechanism may be almost if not quite identical with that of Fig. 2, except that it is submerged and mounted on the cover plate. In the construction shown in both Figs. 3 and 4 the shift ring would be actuated in the usual manner by shift arms from a gate shaft extending through the bulkhead from the governor, as is customary in hydraulic motor designs.

Referring again to Fig. 2, the turbine band 3 is extended to greater width than customary in other turbines and to it is attached by bolts, screws, keys or the like, the flange 20 which in turn is bolted or otherwise attached to the generator rotor 21. In lieu of a generator rotor this may be the hub of a belt pulley, gear, wheel, chain sprocket or the like.

Flange 20 is preferably faced with a replaceable wearing surface 22, bronze or brass which bears against the lignum vitæ thrust bearing surface 23 carried by the inner end of the draft tube. The hub of the rotor is provided with a lignum vitæ lining 24 preferably bearing upon a removable sleeve 25 of brass or bronze mounted upon the periphery of the draft tube. The bronze and lignum vitæ are interchangeable in either case as between the fixed and revolving elements. Other types of bearings are also suitable as Babbitt, Kingsbury, ball or roller and the like, but lignum vitæ or other wood surfaces are preferable because of the adaptability of wood to lubrication by water alone.

Since the draft tube is under suction pressure at the thrust bearing 22—23 and guide bearing 24—25 it will tend to draw in air through the clearances between the bearing surfaces instead of expelling water for lubrication. To provide for lubrication, passages 26 are provided at intervals leading through the runner band and flange from the pressure side of the turbine blades into the annular space 27 from which the water will be forced by pressure through both the thrust and the guide bearings. Or to permit of adjusting the rate of flow and for cases where the river water carries too much sediment, water can be conducted from an external source of pressure, as from the headwater, or pump, through pipe or pipes 28 to the annular space 27 and can be regulated by a valve in the supply pipe 28. Preferably both the fixed and adjustable supplies should be used simultaneously.

The lignum vitæ or other wooden bearing surfaces 23 and 24 are preferably made of wooden strips driven into dovetailed slots in the castings and then turned to an even smooth surface in a well known manner.

When the turbine is operating the leakage through the clearance between runner band 3 and the fixed flange 29 on the bulkhead, will be greatly reduced by the addition of a sealing ring 30 shown in greater detail in Fig. 5. This is a split ring of soft metal and light weight similar to a piston ring and similarly placed in a groove in the runner band, with which it is compelled to rotate by one or more dowels 39. It is held outward against the fixed flange 29 by the centrifugal force of its rotation rather than by its stiffness as in the case of a piston ring.

The use of this sealing ring is not considered absolutely essential as the leakage in any case can not be entirely eliminated and can be readily collected and drained away by a device to be described.

This device is used both for leakage at the runner band 3 and that escaping from the bearing 24—25, and consists of internally grooved rings 31 and 32, the former attached to and rotating with the flange 20 and the other or external ring fixed to the bulkhead flange 29. When in operation the leakage through the clearance is first caught in the inside or revolving ring 31 and forced outwardly in this ring by centrifugal force. At or near the bottom of the turbine, one or more pipes 33 project from the fixed parts into the revolving ring 31 with their ends bent as a Pitot tube and directed against the movement of the revolving water. In this manner the leakage water is automatically ejected into a suitable drain. Pipe 33 may also be conducted to a pump, Venturi tube, water ejector or other device for maintaining a permanent suction if desired, thus assisting the drainage.

The outside or fixed ring 32 is designed to intercept any chance spray escaping from the inner ring and to drain away the water when the unit is idle. In the latter case the water escaping along the upper half of the runner band will fall downward onto the flange 29 and flow around this flange to the horizontal center line of the turbine, whereupon it will fall into outer ring 32 to be drained away at the bottom by drain 34. Suction is preferably maintained in pipe 33 even when the unit is at rest, but should this fail and the pipe become air bound in acting as a siphon the leakage water will merely overflow the bottom of ring 31 into the outer ring 32 and drain away without harm.

Should it be found that spray has a tendency at times to escape onto the generator rotor between rings 31 and 32 the trouble can be eliminated by the addition of a few small vanes 35 to the revolving ring 31 which will act as a blower and produce an inward suction through the clearance between rings 31 and 32 and an outward current of air through pipe 34.

Referring to the generator, 21 indicates the hub; 36 the spokes, if any are required to obtain the desired diameter of rotor; 37 the pole pieces and 38 the stator. The stator is of ordinary construction resting upon a base in the usual manner of a horizontal generator. The spokes of the rotor are here shown offset to remove the generator farther from the bulkhead. This design together with a widening of the runner band can be utilized to any extent necessary to remove the generator a sufficient distance from the bulkhead to obtain necessary clearance for inspection and lubrication of governing mechanism, etc. Also a screen-like guard to prevent contact with rotating parts (not shown) would be desirable for safety in operation.

In lieu of the generator rotor, or combined with it to furnish mechanical drive for the exciter or other purpose, a belt pulley, chain sprocket, or gear may be provided. The collector rings for exciter current will necessarily be of large diameter encompassing the draft tube, but otherwise involve no problems and are consequently not shown.

Figure 6:
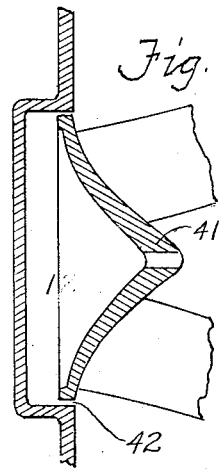
Fig. 6 is a fragmentary section of a runner with shaft and its bearing omitted, but runner housing retained.
Figure 7:
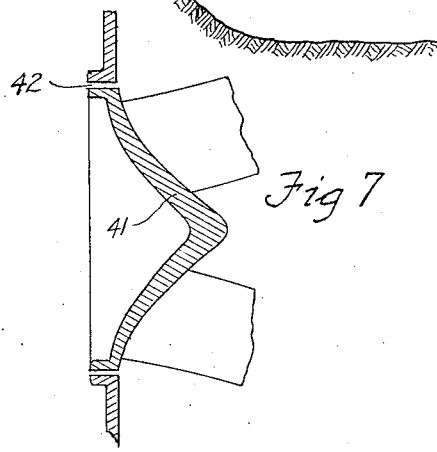
Fig. 7 is a fragmentary section of a runner with the shaft, bearing and runner housing omitted.

In Figs. 6 and 7 are shown fragmentary views of a turbine runner with the shaft and bearing omitted. The weight of the turbine runner is so small as compared with the weight of the generator rotor that it is considered feasible to support it from the generator bearing 24—25 as a cantaliver even when the penstock is empty. When the penstock is full nearly the entire static pressure will be effective against the runner hub 41 which will insure the perfect seating of thrust bearing 22—23 and thus make bearing 6 shown in Fig. 2 unnecessary. Chamber 12 of Figs. 2 and 6 is vented to the draft tube to reduce the pressure against the thrust bearing. Since this is not possible in Fig. 7, a greater pressure would exist against the thrust bearing, but this disadvantage would be at least partly offset by the fact that the leakage through clearance 42 would be useful rather than waste as in Figs. 2 and 6 and furthermore the simplicity of construction is desirable. If preferred, however, a cap as in Fig. 6 may be placed over the end of the runner to inclose the same without employing a bearing at this end. In some instances it may be desirable to employ a runner shaft having a central bearing downstream from the runner, in which case the bearing would be supported by a spider or tension rods from the surrounding walls of the draft tube.

For convenience in assembling and disassembling the unit shown in Fig. 2, the chamber 12 is made with sufficient clearance to permit moving the runner to the left (Fig. 2) after removing flange 43 and ring 44; a sufficient distance so that runner band 3 can be drawn entirely out of flange 20. After removing leakage rings 31 and 32 and disconnecting flanges 45, 46 and 47 the entire generator with the removable section of draft tube can be lifted out. Thereafter the runner can be moved to the right and taken out through the same opening. Joint ring 49 can then be disconnected from bulkhead 7 and grouting ring 48, and the entire turbine casing can be moved to the right and lifted out if desirable. In original installations the entire unit, including draft tube bulkhead 7 and grouting ring 48 would preferably be installed and lined up and ring 48 thereafter grouted in place, insuring a perfect fit.

It is believed that my invention and its mode of assembly and operation will be apparent from the foregoing without further description, but it should be understood that the structural details disclosed are capable of wide variation without departing from the principles of my invention.

I claim:

1. A hydromotive unit comprising an inward flow hydraulic turbine and power transmitting means secured to the periphery thereof and rotatable therewith.

2. A hydromotive unit comprising an inward flow hydraulic turbine having a circumferential band and power transmitting means secured to and offset longitudinally from said band to rotate therewith.

3. In a hydraulic unit the combination of a draft tube, an inward flow hydraulic turbine comprising a circumferential band disposed in alinement with said draft tube, a generator rotor rotatably surrounding said draft tube, and means for rigidly securing said rotor to said band to rotate therewith.

4. In a hydromotive unit the combination of a draft tube, a hydraulic turbine comprising a circumferential band disposed in longitudinal alinement with said draft tube, a generator rotor rotatably mounted upon said draft tube, circumferentially arranged bearings for said rotor surrounding said draft tube, end thrust bearings for said turbine band, and means for connecting said band to said rotor.

5. In a hydromotive unit the combination of an inward flow hydraulic turbine provided with a circumferential band, a draft tube, a rotor surrounding and rotatably carried by said draft tube, means rigidly connecting said rotor to said band, end thrust bearings between said band and said draft tube, and means for supplying water under pressure to said bearings.

6. The combination of an inward flow hydraulic turbine runner, control gates therefor, a draft tube, a rotor surrounding and rotatably mounted upon said draft tube, driving connections between the circumference of said runner and said rotor, and control mechanism for said gates disposed outside the water passage in accessible position between said gates and said rotor.

7. The combination of an inward flow hydraulic turbine runner, control gates therefor, a draft tube, a rotor surrounding said tube and connected to said runner, and control mechanism for said gates also surrounding said draft tube and disposed entirely outside the water passage.

8. The combination of a hydraulic turbine runner, provided with a circumferential band, a member encircling said band, a ring interposed between said band and said member to seal the passage therebetween, an end thrust bearing for said band, and means for collecting and delivering the leakage past said band.

9. The combination of an inward flow hydraulic turbine runner, provided with a circumferential band, a draft tube disposed throughout its effective length in axial alinement with said runner, a flange secured to said runner band, end thrust bearings between said flange and the opposed end of said draft tube, a rotor attached to said flange and surrounding said draft tube, circumferential bearings interposed between said draft tube and said rotor, means for collecting and delivering the leakage between said runner and said draft tube, and means for controlling the flow of water to said runner.

10. The combination of a hydraulic turbine runner provided with a circumferential band, a draft tube, end thrust bearings between said draft tube and said runner at the down-stream end of said runner, a removable ring arranged to engage said band and prevent movement of said runner in an upstream direction, a rotor secured to said band to rotate therewith around said draft tube, circumferential bearings interposed between said draft tube and said rotor, control gates for said runner, and controlling mechanism outside the water passage whereby said gates may be regulated.

11. The combination of a hydraulic turbine runner, a draft tube disposed in axial alinement with said runner, said draft tube comprising a removable section, a rotor surrounding said tube and attached to said runner to rotate therewith, said runner being bodily removable through the aperture in the draft tube provided by the removal of said removable section.

LEROY F. HARZA.